United States Patent
Howell et al.

(10) Patent No.: US 7,391,294 B2
(45) Date of Patent: Jun. 24, 2008

(54) ELECTRODYNAMIC MACHINE

(75) Inventors: David James Howell, Auckland (NZ);
Drazen Jaksik, Auckland (NZ)

(73) Assignee: Wellington Drive Technologies Limited, Auckland (NZ)

( * ) Notice: Subject to any disclaimer, the term of this patent is extended or adjusted under 35 U.S.C. 154(b) by 0 days.

(21) Appl. No.: 10/540,222

(22) PCT Filed: Dec. 12, 2003

(86) PCT No.: PCT/NZ03/00274

§ 371 (c)(1),
(2), (4) Date: May 16, 2006

(87) PCT Pub. No.: WO2004/057629

PCT Pub. Date: Jul. 8, 2004

(65) Prior Publication Data

US 2006/0232371 A1 Oct. 19, 2006

(30) Foreign Application Priority Data

Dec. 20, 2002 (NZ) ................................. 523324

(51) Int. Cl.
*H01F 27/30* (2006.01)
*H02K 1/12* (2006.01)
(52) U.S. Cl. .................... 336/208; 310/258; 336/198
(58) Field of Classification Search ................ 336/208
See application file for complete search history.

(56) References Cited

U.S. PATENT DOCUMENTS

| 4,462,016 A | | 7/1984 | Bland et al. |
| 4,639,707 A | * | 1/1987 | Tanaka et al. ............... 336/185 |
| 4,782,582 A | | 11/1988 | Venezia |
| 4,896,839 A | | 1/1990 | Curtis, Jr. et al. |
| 5,583,475 A | | 12/1996 | Raholijaona et al. |
| 5,986,377 A | * | 11/1999 | Yamada et al. .............. 310/216 |
| 6,892,439 B1 | * | 5/2005 | Neal et al. ................... 29/596 |
| 6,941,644 B2 | * | 9/2005 | Shteynberg et al. ........... 29/605 |

FOREIGN PATENT DOCUMENTS

| CN | 85109646 | | 2/1987 |
| CN | 1242867 | | 1/2000 |
| JP | 7-283067 | | 10/1995 |
| JP | 2003-70216 | | 3/2003 |
| JP | 2004158684 A | * | 6/2004 |

* cited by examiner

*Primary Examiner*—Anh Mai
*Assistant Examiner*—Joselito Baisa
(74) *Attorney, Agent, or Firm*—Young & Thompson

(57) ABSTRACT

A winding for a toroidal electrodynamic machine is formed by providing a set of bobbins in a rectilinear array, winding the bobbins so that each phase is of one continuous wire, with each set of phases wound one bobbin at a time, the completed rectilinear array then being formed into a circular array for the machine. The rectilinear array has bobbins formed and is wired in such a way that bending into a torus is possible.

20 Claims, 2 Drawing Sheets

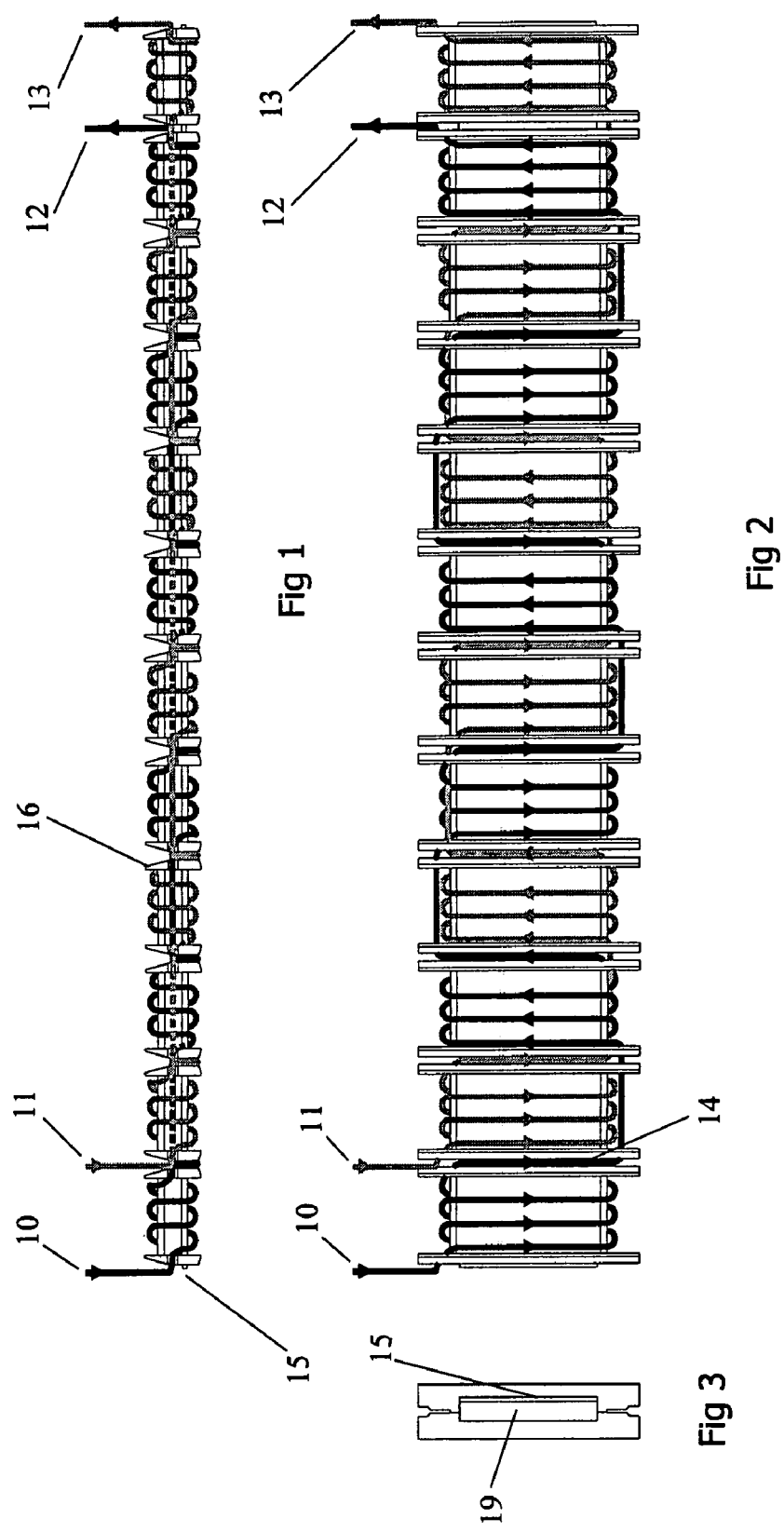

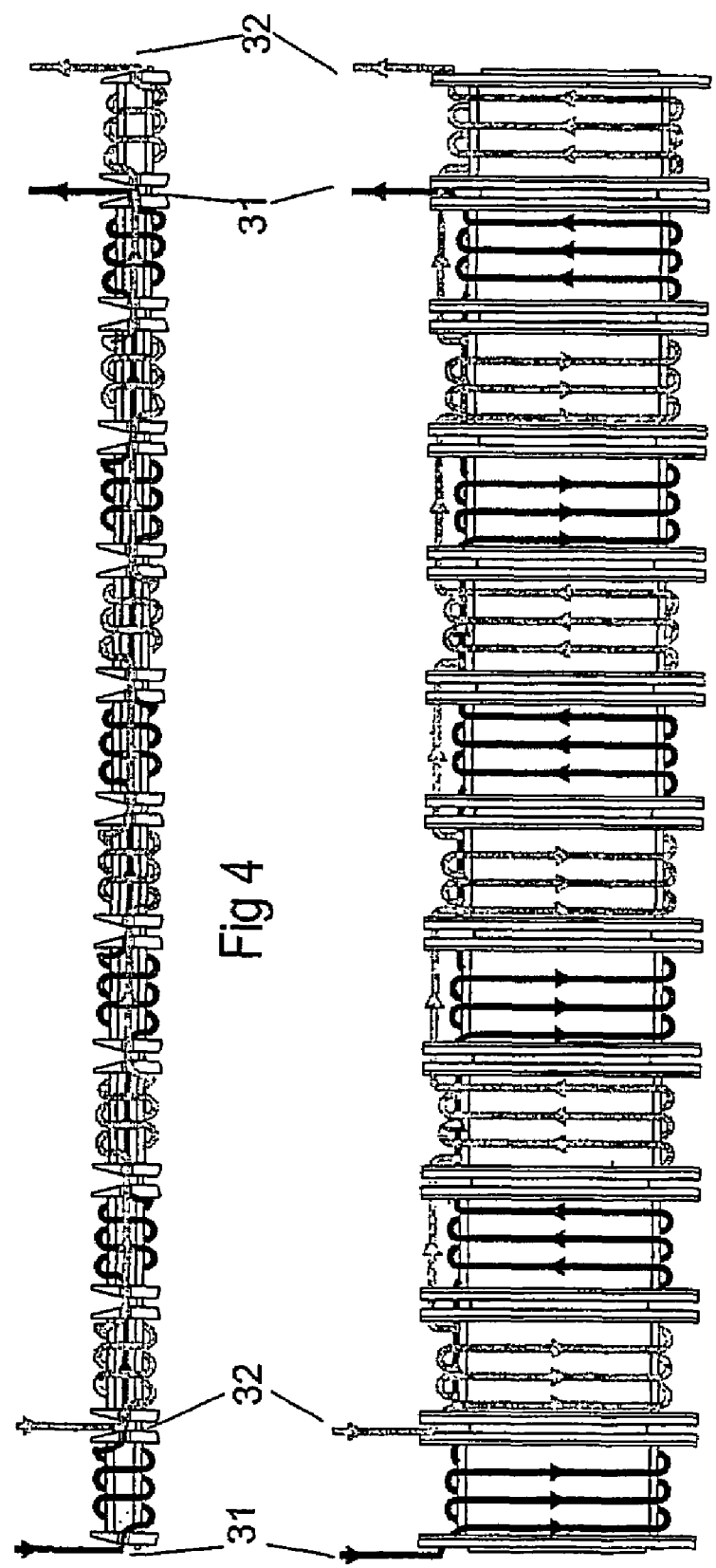

ELECTRODYNAMIC MACHINE

TECHNICAL FIELD

This invention relates to toroidally wound electrodynamic machines.

BACKGROUND ART

Toroidally wound electrodynamic machines consist of stator and rotor, the stator being formed from a toroidal electromagnetic core with a coil or coils wound upon that core, the coil axis being substantially tangential to the core. Such stators are by their very nature relatively difficult to construct, in that complex equipment is required to form the windings about the core.

To overcome this difficulty some manufacturers have wound the coils onto multiple separate bobbins using simple winding equipment, and the wound bobbins are later introduced onto a split magnetic core. The two ends of the wires of each coil must then be electrically connected in a correct relationship with other coils forming a ring of electromagnets. This has been accomplished previously by connecting each wire to a circular printed circuit board with the conductive paths on the printed circuit board being designed to provide the required connections of the coils in the group. Alternatively the wires are individually connected by methods such as insulation displacement connectors. However this process can be complex and expensive.

OBJECT OF THE INVENTION

It is therefore an object of the present invention to provide a toroidally wound electrodynamic machine constructed using a series of pre-formed windings which are created in an electrically continuous manner during the winding process, which will reduce the complexity of the assembly, or which will at least provide the public with a useful choice.

STATEMENT OF THE INVENTION

Accordingly, the invention may broadly be said to consist in a method of winding a toroidally wound electrodynamic machine characterised in that a set of bobbins are located in a rectilinear array, the rectilinearly located bobbins are wound with a continuous wire or a continuous set of parallel wires for each phase, the wound bobbins then being formed into a circular array.

Preferably each phase is wound one bobbin at a time.

Preferably the assembly of pre-wound and electrically connected bobbins is formed into a circular array positioned about a toroidal core of magnetic material, such core passing through an aperture in each bobbin Preferably the bobbins interfit, to positively locate with each other.

Alternatively the bobbins may be manufactured jointly, as a single part or multiple inter-fitting parts which may be deformed into a toroid after winding.

Preferably the bobbins are provided with pathways to support the wires as they pass from one winding to another.

Preferably the toroidally wound electrodynamic machine is an electric motor.

Alternatively the invention lies in a wound bobbin set for a toroidally wound electrodynamic machine comprising a set of wound bobbins formed into a circular array positioned about a toroidal core of magnetic material, such core passing through the central aperture in each bobbin, characterised in that the windings of two or more bobbins in each phase are formed from a continuous wire or a continuous set of parallel wires.

Preferably the winding method and bobbins provide free space between the bobbins sufficient to allow forming them into a circular array while still providing contact between the bobbins at a pivot axis on the side of the bobbin core.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

DRAWING DESCRIPTION

One preferred form of the invention will now be described with reference to the accompanying drawings in which, FIG. 1 is a plan view of a series of bobbins as mounted on a former, FIG. 2 is an elevation view of the same bobbins FIG. 3 is an end view of a bobbin FIG. 4 is an elevation view of similar bobbins showing an alternative path for the wires FIG. 5 is an elevation view of the bobbin of FIG. 4

DESCRIPTION OF THE PREFERRED EMBODIMENT

With reference to FIG. 1, a coil for a toroidally wound machine is manufactured as a series of bobbins which comprise two phase windings starting at 10, 11 and ending at 12, 13. For winding the coils are mounted on a rectangular former or a toroidal core 19 (FIG. 3). The winder preferably has a multi-wire winding head and winds bobbins for each phase simultaneously.

In FIG. 2 the drawing shows how having filled one pair of bobbins the wire is routed to the next pair by shifting the former in relation to the winding heads sufficiently to slot the wire into the inter-bobbin space at 14, rotating the former a half turn and translating it so that the winding heads feed into the next pair of bobbins. This maintains tension on the wire in the bobbins. This process continues until all of the bobbins are filled.

Alternative methods to the half turn between bobbins are possible to maintain tension on the last winding turn in the bobbin. For example other indirect paths may be used, or one or more turns of wire may be wrapped round a pin formed into the bobbin edge, or may be trapped in a retainer fixed to the bobbin.

FIGS. 4 and 5 show a bobbin set with wires 31, 32 wound by simply translating the winding head between bobbins without a half turn rotation. While the wires are not tensioned to the same extent at winding there are advantages in that when winding all phases simultaneously the winding process can proceed more quickly and without manual intervention.

The bobbins preferably have an external shelf 15, one edge of which forms the pivot axis between bobbins. If a winding configuration similar to that shown in FIG. 1 is being used, the wire being routed between bobbins may lay on this shelf for support. The shelf, in combination with the tapered edges 16 on one side of the bobbin, assists in providing a stable coil configuration and a good packing factor when the bobbins are placed in a curved path on the toroid in the machine.

Where the coils are wound for more than two phases the wires for differing phases may be offset in separate bobbin cheek notches while bridging across adjacent bobbins, and any underwires may be recessed into the bobbins. The use of a linear array of bobbins with multiple phases makes it particularly easy to automatically wind the complete bobbin set since the winding heads are translated the same amount for each phase set of bobbins.

The end wires of the phases may be secured to pins on the bobbins either permanently, or temporarily for handling, or alternatively may be connected directly to the terminations on the machine without requiring any subsidiary terminations on the coil assembly The bobbins may have extensions at the inner edge of the through hole to project into corresponding cavities in the next bobbin and locate the two together. These projections are proportioned so that they do not project into the central cavity through which any core must be placed.

Alternatively the bobbins may be a single assembly of moulded plastics, severed to the desired length. On completion of winding the assembly is bent, fracturing or distorting along one side and at top and bottom of the join between each pair of bobbins.

Once the bobbins have been wound they may be removed from the winding machine and bent into a toroid, the inner cheeks of the bobbins being tapered as shown at 16 to allow this. Although the outer edges of the bobbins will separate to some extent the shelf 15 is proportioned to maintain correct positioning and tension of the wire passing between bobbins.

Thus it can be seen that at least the preferred form of the invention provides a toroidally wound electrodynamic machine combining the advantages of being able to wind the toroidal electrical coils while arranged in a straight line, without the added complexity of having to electrically join the coils during machine construction.

INDUSTRIAL APPLICABILITY

The invention is applicable to the construction of toroidally wound electrodynamic machines in a manner providing efficiencies in the manufacture thereof.

The invention claimed is:

1. A method of winding a toroidally wound electrodynamic machine, comprising the sequential steps of:
    forming a set of bobbins located in a rectilinear axially aligned array of adjacent bobbins, with the rectilinearly located bobbins wound with a continuous wire or a continuous set of parallel wires for each phase; and
    forming the wound rectilinear array of bobbins, by bending the rectilinear array of bobbins as a whole, into a circular axially aligned array as an electrodynamic machine winding with each bobbin being connected to an adjacent bobbin by physical contact with the adjacent bobbin.

2. A method as claimed in claim 1 characterised in that the each phase is wound one bobbin at a time.

3. A method as claimed in claim 1 characterised in that the assembly of pre-wound and electrically connected bobbins is formed into a circular array positioned about a core of magnetic material, such core passing through an aperture in each bobbin.

4. A method as claimed in claim 1 characterised in that the bobbins interfit, to positively locate with each other.

5. A method as claimed in claim 4 characterised in that the bobbins are manufactured jointly, as a single part or multiple inter-fitting parts which may be deformed into a toroid after winding.

6. A method as claimed in claim 1 characterised in that the bobbins are provided with pathways to support the wires as they pass from one bobbin to another.

7. A method as claimed in claim 6 characterised in that part of the pathway extends normal to a bobbin axis between two bobbins.

8. The method as claimed in claim 1, wherein,
    the set of bobbins is a single assembly of moulded plastic bobbins with adjacent bobbin pairs connected at a join, and
    during said forming step, the wound bobbins are bent along one side and at a top and a bottom of the join between each pair of bobbins to form the circular coil.

9. A method as claimed in claim 1, wherein the bobbins are provided with pathways to everywhere support the wires as they pass from one bobbin to another.

10. A method of winding a toroidally wound electrodynamic machine, comprising the sequential steps of:
    mounting a set of bobbins onto a former to define a rectilinear axially aligned array of adjacent bobbins, the bobbins joined to each other;
    winding the set of bobbins defining the rectilinear axially aligned array of adjacent bobbins with a continuous set of parallel wires for each phase to form a coil for a toroidally wound machine as a series of bobbins which comprise two phase windings starting at a first distal end of the former and ending at an opposite, second distal end of the former; and
    forming the wound rectilinear array of bobbins, by bending the wound rectilinear array of bobbins as a whole into a circular array as a circular coil for the toroidally wound machine with the adjacent bobbins being in physical contact.

11. A method as claimed in claim 10, wherein,
    the set of bobbins is a single assembly of moulded plastic bobbins with adjacent bobbin pairs connected at a join,
    in said mounting step, the single assembly is mounted onto the former, and
    during said forming step, the wound bobbins are bent along one side and at a top and a bottom of the join between each pair of bobbins to form the circular coil.

12. A method as claimed in claim 10, wherein,
    the set of bobbins is a single assembly of bobbins adjacently fixedly joined, and
    the single assembly of bobbins is mounted onto the former in said mounting step.

13. A method as claimed in claim 10, wherein the bobbins are provided with pathways to everywhere support the wires as they pass from one bobbin to another.

14. The method of claim 10, wherein,
    the bobbins have an external shelf, one edge of each external shelf forming a pivot axis between the bobbins,
    the wire is routed between bobbins and are continuously, supported by the external shelf, and
    the bobbins each have tapered edges on one side for defining a curved path when forming the wound bobbins into the circular array.

15. The method of claim 10, wherein,
    the bobbins each have a cavity and an extension such that the extension of each bobbin fits into the cavity of an adjacent bobbin.

16. A wound bobbin set for a toroidally wound electrodynamic machine comprising a set of wound bobbins initially wound as a single assembly rectilinear axially aligned array of adjacent bobbins and formed by bending the single assembly wound array as a whole into a circular axially aligned array with each bobbin being connected to an adjacent bobbin by physical contact with the adjacent bobbin, the windings of two or more bobbins in each phase being formed from a continuous wire or a continuous set of parallel wires.

17. A wound bobbin set as claimed in claim 16 characterised in that the winding method and bobbins provide free space between the bobbins sufficient to allow forming them into a circular array while still providing contact between the bobbins on the side of the bobbin.

18. A wound bobbin set as claimed in claim 16 characterised in that the bobbins are tapered on the inner cheeks to facilitate forming into a circular array.

19. An electrodynamic machine when fitted with a winding as claimed in claim 16.

20. The wound bobbin as claimed in claim 16, wherein,
the set of bobbins is a single assembly of moulded plastic bobbins with adjacent bobbin pairs connected at a join, and
the wound bobbins are bent along one side and at a top and a bottom of the join between each pair of bobbins to form the circular coil.

* * * * *